(No Model.)

W. W. TURNBULL.
MACHINE FOR COMPRESSING AND MOLDING POPCORN.

No. 545,832. Patented Sept. 3, 1895.

WITNESSES:
H. C. B. Bradshaw
Chas. I. Welch

INVENTOR
Ward W. Turnbull
BY
Statts & Shepherd
ATTORNEYS

UNITED STATES PATENT OFFICE.

WERD W. TURNBULL, OF BELLEFONTAINE, ASSIGNOR OF ONE-HALF TO C. F. COST, OF SPRINGFIELD, OHIO.

MACHINE FOR COMPRESSING AND MOLDING POPCORN.

SPECIFICATION forming part of Letters Patent No. 545,832, dated September 3, 1895.

Application filed June 6, 1894. Serial No. 513,712. (No model.)

*To all whom it may concern:*

Be it known that I, WERD W. TURNBULL, a citizen of the United States, residing at Bellefontaine, in the county of Logan and State of Ohio, have invented certain new and useful Improvements in Machines for Compressing and Molding Popcorn, of which the following is a specification.

My invention relates to machines for compressing and molding popcorn into what are known as "popcorn-fritters;" and the object of my invention is to provide a machine which shall be capable of turning out a large number of such popcorn-fritters in a uniform and substantially-continuous manner, the device being substantially automatic in its operation.

A further object of my invention is to provide in a machine of this character means by which certain of the parts may be adjusted to modify the product of the machine.

I attain these objects by the constructions shown in the accompanying drawings, in which—

Figure 1:
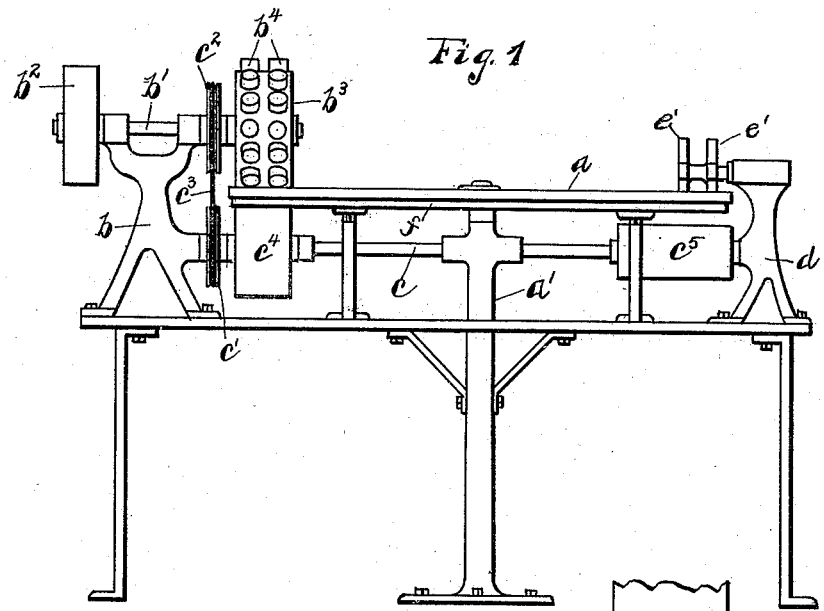
Figure 2:
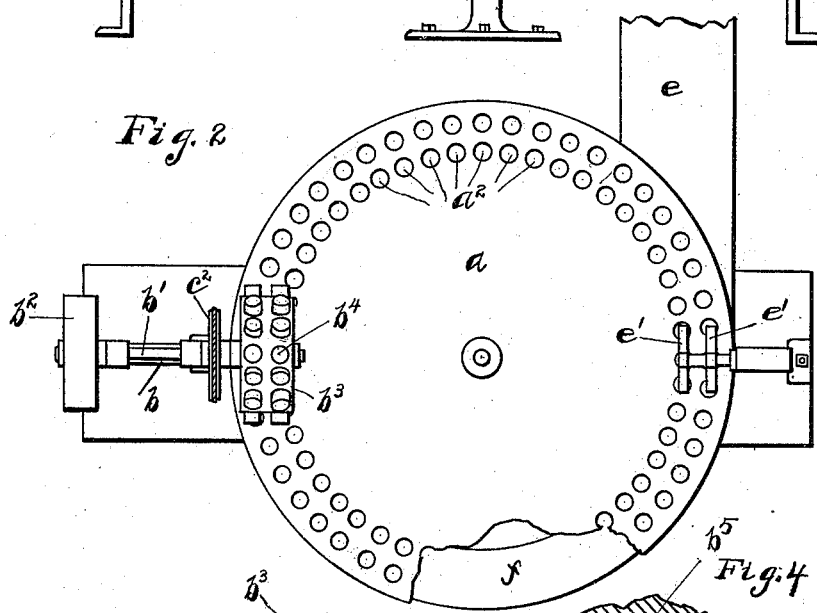
Figure 3:
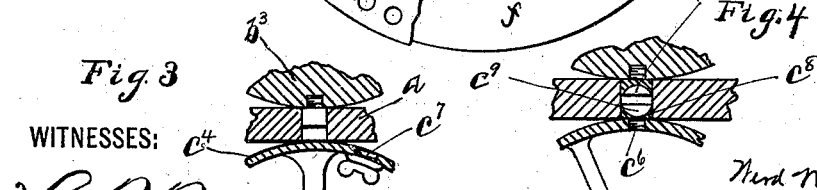
Figure 4:
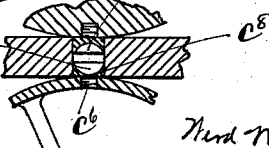

Figure 1 is a side elevation of a machine embodying my invention. Fig. 2 is a plan view of the same. Figs. 3 and 4 are details of some of the parts hereinafter referred to.

Like parts are represented by similar letters of reference throughout the several views.

It has been common to manufacture popcorn into what are known as "popcorn-fritters." The corn, being first popped, is treated to a hot solution of boiled molasses or similar substance which will harden when cool. The corn is then molded into small round disks or cakes, and the machine which I have devised is for molding these rapidly and uniformly.

In the accompanying drawings, $a$ is a revolving table mounted upon a suitable bearing on a supporting standard $a'$. This table is provided near its outer periphery with a series of circular perforations $a^2$, arranged at equal distances apart and of a size corresponding to the size of the cake to be molded. At one side of the table is a supporting-head $b$, which carries a revolving shaft $b'$, having at one end a driving-pulley $b^2$, and at the other a compressing-wheel $b^3$, having a straight periphery on which is mounted a series of projections $b^4$, adapted to successively enter the openings $a^2$ in the table as the same is revolved. I have shown two rows of perforations in the table and two rows of projections on the compressing-wheel, though one or more rows may be employed, as desired. When more than one row is employed, those nearest the center of the table will have to be slightly smaller than the outer row, for obvious reasons.

Immediately under the table is a transverse shaft $c$, journaled at one end in a suitable bearing in the head $b$ and at the other end in a supporting-standard $d$. This shaft carries a small sheave or pulley $c'$, which is driven from a sheave $c^2$ on the shaft $b'$ by a belt $c^3$.

Immediately under the compressing-wheel $b^3$ is a supporting-wheel $c^4$, having a plain periphery, on which the table is adapted to rest. On the opposite end of the shaft $c$ is provided a suitable roller or pulley $c^5$, over which passes a belt $e$ of canvas or other suitable material, which passes outwardly from the table to any desired point, where it is supported by a roller in the usual manner to form an endless carrier. Immediately over the carrying-belt $e$ and supported in the standard $d$ are a series of star-wheels $e'$, having projections of a suitable distance apart to engage successively in the openings $a^2$ in the table. Immediately under the revolving table, at one side thereof and extending from a point near the compressing-wheel to a point near the star-wheel, is a stationary guide or support $f$, adapted to close the bottoms of the respective perforations $a^2$ as they pass over said stationary guide or support.

The power to drive the device is supplied from any suitable source to the driving-pulley $b^2$. This causes the shaft $b'$ to revolve, carrying with it the compressing-wheel $b^3$. As the compressing-wheel revolves, the respective projections thereon engage successively in the perforations in the table and cause the table to revolve. The belt $c^3$ produces a corresponding movement of the shaft $c$ and the supporting-wheel $c^4$. If a belt is employed for this purpose, it should be crossed in order to insure the proper direction of travel of the respective wheels $b^3$ and $c^4$.

The corn, being first prepared in the usual manner, is placed by the operator on the revolving table, so as to fill the respective openings $a^3$ as they pass over the supporting plate or guide $f$, said openings being filled loosely to the top with the corn in a soft waxy condition. As the table is carried forward, the openings are brought successively between the compressing and supporting wheels $b^3$ and $c^4$, and the projections on said compressing-wheel enter the openings and press the corn against the supporting-wheel into a solid cake. As the respective openings come under the star-wheels $e'$, said star-wheels are revolved by contact with said openings and the projections thereon force the cakes out of the perforations onto the endless carrier $e$, by which they are delivered to any convenient point for packing.

The revolving table is made of such a size and revolved at such a rate as to permit the cakes to harden slightly in passing from the compressing-wheel to the star-wheels, so that they are readily pushed out of the openings by the perforations on said star-wheels.

The endless carrier is made of sufficient length that when the cakes have reached the limit of their travel thereon they are substantially cold and ready for packing or storing.

In order to provide for making the cakes into different shapes, I preferably form the projections $b^4$ on the compressing-wheel removable, and form a corresponding number of openings $c^6$ in the supporting-wheel $c^4$. These openings $c^6$ are normally closed by screw-threaded plugs $c^7$, which are inserted through the rim of said wheel from the bottom, so that the outer ends stand flush with the periphery of the wheel and leave the same perfectly plain when making the plain cakes. By removing the plugs $c^7$, however, projections $c^8$ may be secured in said openings corresponding to the projections in the compressing-wheel.

In Fig. 4 I have shown the projections in the respective wheels formed with concave depressions $c^9$ and $b^5$, respectively. By the use of this form of projection the cakes, instead of having flat ends, will be formed with convex ends, or by making the projections of the proper length and size they could be formed in the shape of balls. Any number of different forms of projections could be used in the same machine by removing one form and inserting the other, thus giving a great variety to the shapes in which the cakes could be manufactured.

Having thus described my invention, I claim—

1. A revolving table having a series of perforations, a compressing wheel having projections to enter said perforations, a support adapted to form a bottom for the said perforations during a portion of the revolution of said table, and an opposing support on the opposite side of said table from said compressing wheel, and means for revolving said compressing wheel to cause said perforations to come respectively opposite to the projections thereon, substantially as, and for the purpose specified.

2. A revolving table having a series of perforations extending entirely through the same, a compressing wheel having a series of projections to correspond to said perforations, a supporting wheel arranged opposite said compressing wheel, means for revolving said compressing wheel, a stationary support at one side of said table adapted to form a bottom for said perforations while the same are passing over said support, and a star wheel having projections to enter said perforations at a point removed from said compressing wheel, substantially as specified.

3. A revolving table having perforations extending through the same, a stationary support to close the bottom of said perforations, a compressing wheel having projections to enter said perforations, and a supporting wheel arranged on the opposite side of said table to said compressing wheel, means for driving said compressing and supporting wheels, substantially as and for the purpose specified.

4. A revolving table, perforations in said table, a stationary support, a compressing wheel having projections to enter said perforations, a supporting wheel arranged opposite to said compressing wheel, an endless carrier extending under said table, and a star wheel arranged above said table having projections to enter said perforations above said carrier, all arranged substantially as and for the purpose specified.

5. The combination with a revolving table having perforations, a stationary support, a compressing wheel having removable projections adapted to enter said perforations, and a supporting wheel also having removable projections in its periphery, substantially as specified.

In testimony whereof I have hereunto set my hand this 23d day of January, A. D. 1894.

WERD W. TURNBULL.

Witnesses:
D. D. MARSHALL,
THOS. H. WRIGHT.